United States Patent [19]

Agarwal et al.

[11] Patent Number: 4,792,888
[45] Date of Patent: Dec. 20, 1988

[54] EXCEPTION PROCESSING OF OPERATOR DISPLAYS

[75] Inventors: Suresh C. Agarwal, Euclid; Edward D. Janecek, Cleveland Heights; Marion A. Keyes, Chagrin Falls; James D. Schoeffler, University Heights; Michael S. Willey, Chagrin Falls, all of Ohio

[73] Assignee: The Babcock & Wilcox Company, New Orleans, La.

[21] Appl. No.: 627,390

[22] Filed: Jul. 3, 1984

Related U.S. Application Data

[63] Continuation-in-part of Ser. No. 360,858, Mar. 22, 1982.

[51] Int. Cl.⁴ ............................................. G06F 15/46
[52] U.S. Cl. .................................. 364/188; 364/138; 364/900
[58] Field of Search ......... 364/188, 189, 200 MS File, 364/138, 142, 178, 179, 900 MS File; 340/722, 791, 793

[56] References Cited

U.S. PATENT DOCUMENTS

| | | | |
|---|---|---|---|
| 3,761,882 | 9/1973 | Bartlett et al. | 364/200 |
| 3,779,731 | 12/1973 | Pollock et al. | 364/178 |
| 4,218,734 | 8/1980 | Ito | 364/118 |
| 4,471,348 | 9/1984 | London et al. | 364/188 |

OTHER PUBLICATIONS

Zaks, Rodney et al., "Microprocessor Interfacing Techniques", Sybex, 1979 pp. 286–287 and 300–302.

Primary Examiner—Eddie P. Chan
Assistant Examiner—Jonathan C. Fairbanks
Attorney, Agent, or Firm—Vytas R. Matas; Robert J. Edwards

[57] ABSTRACT

A display system for displaying select dynamic process data of plant operations to an operator providing a display of only dynamic data having a predetermined difference between current and stored values.

1 Claim, 3 Drawing Sheets

BLOCK DIAGRAM OF DISPLAY UPDATING SYSTEM

BLOCK DIAGRAM
OF EXCEPTION
UPDATE MODULE

EXCEPTION PROCESSING OF OPERATOR DISPLAYS

This is a continuation-in-part of application Ser. No. 06/360,858, filed Mar. 22, 1982.

TECHNICAL FIELD

This invention generally relates to a system for displaying plant process data to plant operating personnel, and more specifically to a system which selectively displays on a cathode ray tube (CRT) only the plant process data which has a predetermined difference between current data and prior data.

BACKGROUND ART

Computer control systems are commonly used to monitor the status of plant processess. At a minimum the plant process monitoring system consists of plant process data acquisition, processing, and display on elements such as CRTs.

Data display on a CRT may include text material consisting of alphanumeric description and/or graphic symbols, static displays consisting of data independent of plant dynamics, and dynamic displays consisting of data, both measured and calculated, which are directly related to plant dynamics. Of these categories, dynamic data display is of paramount importance since it provides the plant operator with current plant status.

To provide a display of dynamic data on a CRT, plant process data are acquired via a multiplexer, processed in a computer system and usually stored in a data base memory. Dynamic data are then accessed from the data base memory by a display program and transfered to the CRT. The prevailing practice has been to periodically access and transfer the plant process data to a CRT at a fixed, prespecified time interval known as an update period. This practice is commonly referred to as continuous updating of CRT displays. With this technique, changes in plant status can be displayed only after the update period has elapsed, that is, on the next update cycle. Thus, the use of this technique does not fully meet the needs of the plant operator who often needs to know of changes in plant status immediately to prevent the occurrance of a crisis situation.

Furthermore, updating the display of all dynamic data on a CRT, including data which has not changed during an update cycle, increases the volume of data which must be accessed from the data base and transmitted to the CRT, thus increasing the computer system load. Consequently, computer system response time for data display on a CRT and the time between occurrence of an event in the plant and its indication on the CRT, is undesirability long. This adds to the time needed by the plant operator prior to taking corrective action. The probability exists in the prior art that a rapidly changing plant process variable may not be displayed at all. Thus it is seen that the prior art technique does not provide for timely updating of plant process data, particularly dynamic data.

Because of the foregoing, it is desirable to develop a display update system which provides for minimum time required for display of critical plant process dynamic data.

SUMMARY OF THE INVENTION

The present invention solves the aforementioned problems associated with the prior art and others by providing a display updating system for displaying plant process data on a CRT only when the absolute value of the difference between the value of each plant process variable displayed on the CRT and the current value of each plant process variable exceeds a predetermined amount. In this manner, data related to all plant process variables are neither accessed from the data base memory nor transmitted to the CRT unless necessary, thus minimizing computer system response time while displaying changes in plant process data which may affect plant status as they occur.

DESCRIPTION OF THE PREFERRED EMBODIMENT

Figure 1:
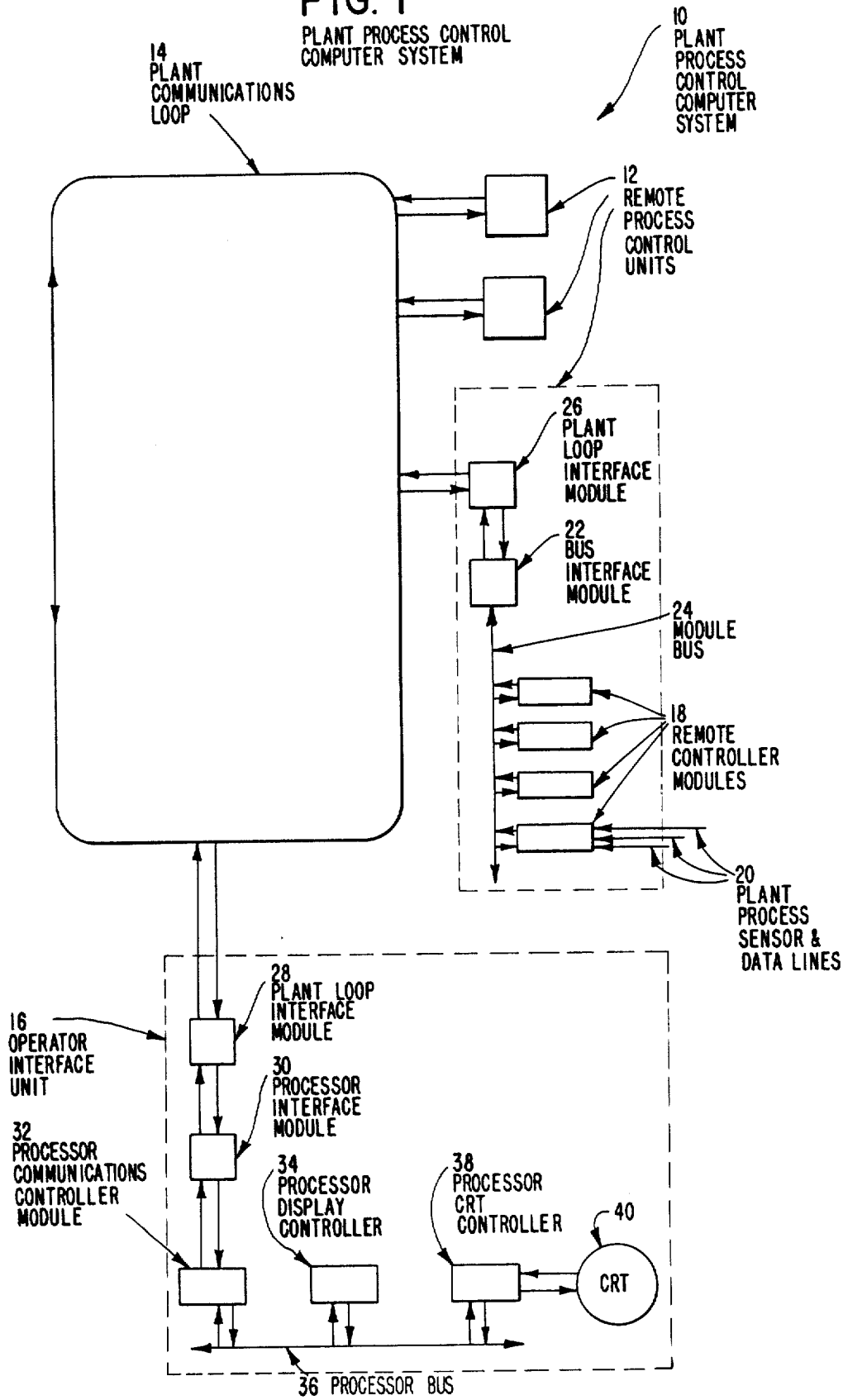
FIG. 1 is a schematic of the overall plant process control computer system including the display updating system of the present invention.

Referring now to the drawings, where the illustrations are for describing the preferred embodiment of the present invention and are not intended to limit the invention hereto, FIG. 1 discloses a plant process control computer system, generally designated 10, is shown which consists of one or more remote process control units 12, a plant communications loop 14, and an operator interface unit 16.

In operation, plant process data from process sensors (not shown) are transmitted to one or more remote controller modules 18 along one or more plant process data lines 20 where the process signals are filtered, amplified, converted to engineering units, and stored. A bus interface module 22 maintains a list for each remote process control unit 12 of all process signal variables presently displayed by the operator interface unit 16 and also the last process signal values actually displayed. The bus interface module 22 receives any significantly changed process signal values from the remote controller module 18 via a module bus 24. The bus interface module 22 updates its local data base and transmits the changed process signal values to the operator interface unit 16 via a plant loop interface module 26 and the plant communication loop 14.

The operator interface unit 16 receives the changed process signal values via a plant loop interface module 28 and a processor interface module 30. The processor interface module 30 maintains a system wide list of the current process signal variables and the process signal values being displayed. The processor interface module 30 communicates all changed process signal values to a processor communications controller module 32, which stores these values in a local data base and notifies a processor display controller module 34 via a processor bus 36. The processor display controller module 34 converts the process signal values to appropriate display codes and commands a processor CRT controller module 38 to send the changed process signal values to a CRT 40.

When the plant operator manually changes the display being shown on the CRT 40, the processor CRT controller module 38 alerts the processor display controller module 34. The processor display controller module 34 generates a new list of process signal variables needed for the new display and sends this list to the processor interface module 30 via the processor communications controller module 32 and the processor bus 36.

The processor interface module 30 determines which new process signal variables can be obtained from each remote process control unit 12 and sends a request for these process signal variables to the appropriate remote process control unit 12 via the plant loop interface module 28 and the plant communication loop 14. This list of needed process signal values is received by the plant loop interface module 26 and sent to the bus interface module 22. The bus interface module 22 then transmits a request for each required process signal value to the appropriate remote controller module 18 via the module bus 24.

The processor interface module 30 also determines which previously displayed process signal variables were obtained from each remote process control unit 12 and sends a cancelation of the request for these process signal variables to the appropriate remote process control unit 12 via the plant loop interface module 28 and the plant communication loop 14. This list of canceled process signal variables is received by the plant loop interface module 26 and sent to the bus interface module 22. The bus interface module 22 then transmits each canceled request for a process signal variable to the appropriate remote controller module 18 via the module bus 24.

Figure 2:
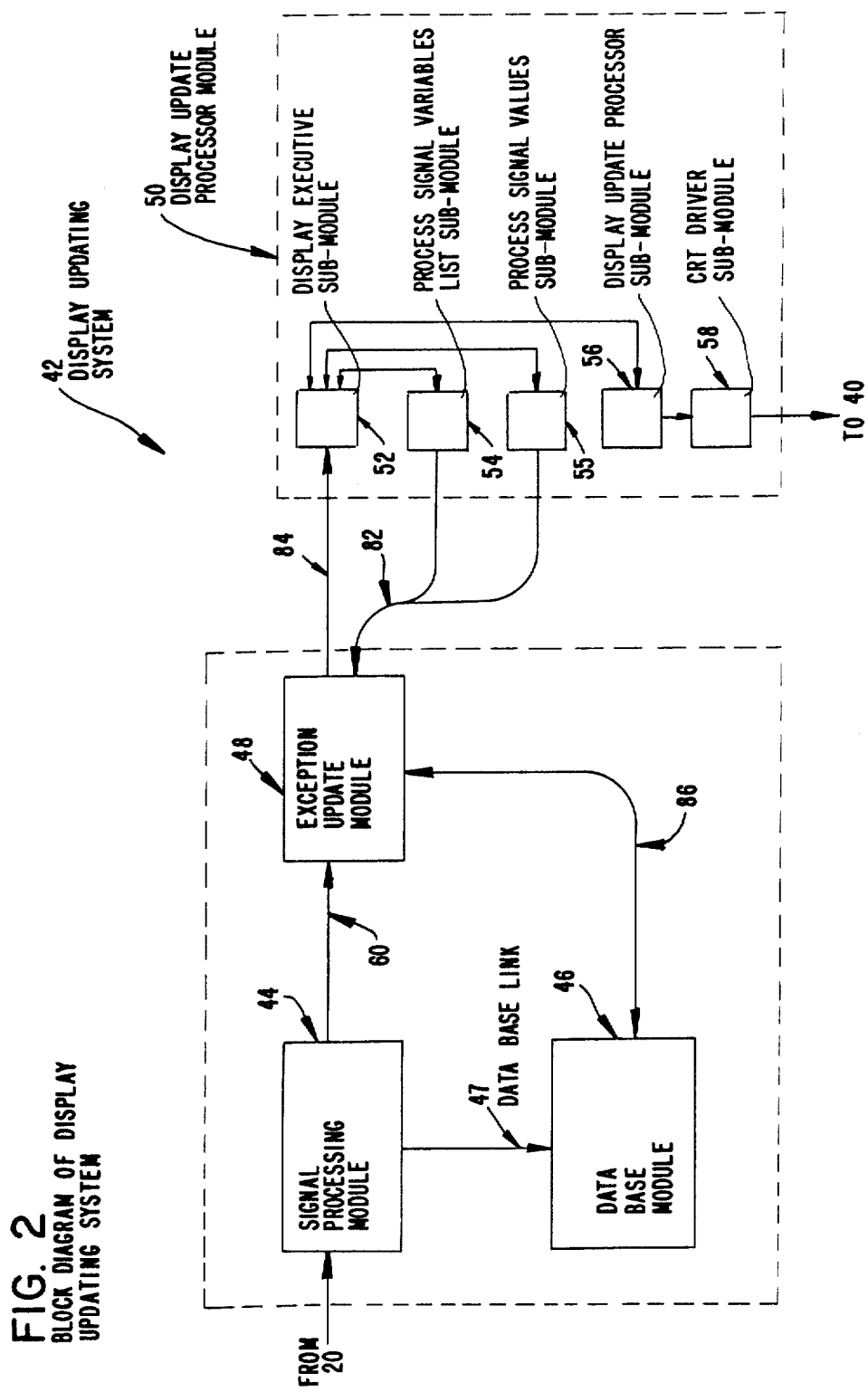
FIG. 2 is a block diagram of the display updating system of the present invention.

Referring now to FIG. 2, a display updating system, generally designated 42, is shown comprising a signal processing module 44, a data base module 46, an exception update module 48, and a display update processor module, generally designated 50, which consists of a display executive sub-module 52, a process signal variables list sub-module 54, a process signal values sub-module 55, a display update processor sub-module 56, and a CRT driver sub-module 58.

The functions of signal processing module 44 and data base module 46 are performed by one or more remote controller modules 18.

The functions of display executive sub-module 52 are performed by the processor communications controller module 32 and the processor display controller module 34.

A complete list of process signal variables for each display which may be chosen by the plant operator is maintained by the processor display controller module 34. The list of process signal variables each display actually chosen by the plant operator for each process signal variables list sub-module 54 is stored in the processor interface module 30 and partial lists are stored for each remote process control unit 12 in its bus interface module 22 and each of its remote process controller modules 18.

The process signal values for the process signal values sub-module 55 are determined by each remote controller module 18 and stored in its data base module 46. The current process signal values for each display chosen by the plant operator are stored for each remote process control unit 12 in its bus interface module 22, processor interface module 30, and processor communications controller module 32.

The functions of display processor sub-module 56 are performed by the processor display controller module 34. The functions of CRT driver sub-module 58 are performed by the processor display controller module 38.

In operation, plant process data from process sensors (not shown) are brought into the signal processing module 44 where the process signals are filtered, amplified, and converted to engineering units. The process signal values are communicated to the data base module 46 along data base link 47 for storage. The signal processing module 44 also generates a signal at the end of each plant process data processing cycle and communicates it along a signal line 60 to the exception update module 48. Receipt of this signal activates the exception update module 48.

Figure 3:
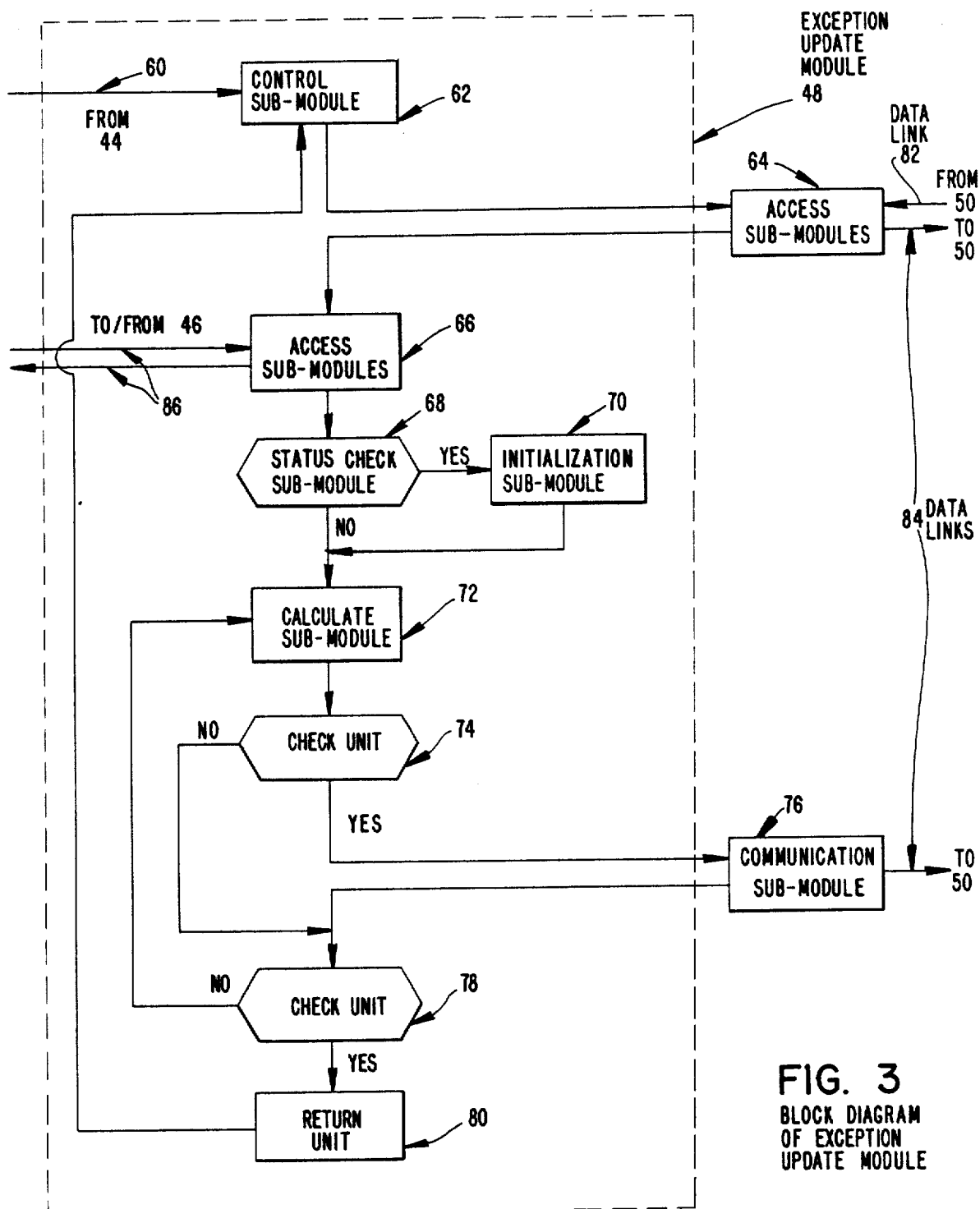
FIG. 3 is a block diagram of the exception update module portion of the display updating system of the present invention.

With particular reference to FIG. 3, the exception update module 48 is detailed as comprising a control sub-module 62, access sub-modules 64 and 66, status check sub-module 68, initialization sub-module 70, calculate sub-module 72, check unit 74, communication sub-module 76, check unit 78, and return unit 80.

All functions shown except those of access sub-module 64, communication facility sub-module 76, and data links 82 and 84 are performed by each remote controller module 18 and its exception update module 48.

The access sub-module 64 and communication sub-module 76 functions are jointly performed by the remote controller module 18, bus interface module 22, and processor controller modules 30, 32, and 34. The data links 82 and 84 are implemented along the module bus 24 by the bus interface module 22 to the loop interface module 26 and via the plant communication loop 14 to the loop interface module 28 and the processor interface module 30, then to the processor controller modules 32, 34, and 38 via the processor bus 36.

In operation signals from the signal processing module 44 triggers the execution of the control sub-module 62 within the exception update module 48. The control sub-module 62, commands access sub-module 64 to send a request along data link 84 to the process signal variables list sub-module 54 and the process signal values sub-module 55 of the display update processor module 50 for a list of the process signal variables presently being displayed and the current process signal values, respectively. The access sub-module 64 receives the list of the process signal variables presently being displayed and the current process signal values along data link 82 and transfers execution to access sub-module 66. The access sub-module 66 then requests and obtains new process signal values for the display from the data base module 46 along a bi-directional data link 86 for each process signal variable in the list.

Next, the status check sub-module 68 determines whether the exception update module 48 is in execution for the first time. If the exception update module 48 is in execution for the first time, then all display update band values, accessed by access sub-module 66, are set to zero by the initialization sub-module 70. If the exception update module 48 is not in execution for the first time, then the status check sub-module 68 is bypassed and execution goes to calculate sub-module 72.

The absolute value of the difference between the new process signal value and the process signal value currently being displayed is calculated in calculate sub-module 72 and checked whether it is greater than a predetermined display update band in check unit 74. If the absolute value is not greater than its associated display update band, then execution goes to check unit 78; otherwise a message comprised of the process signal variable, its new value and indication for detection of exception is formed and sent to the display executive sub-module 52 of the display update processor module 50 (shown in FIG. 2) by the communication facility sub-module 76 along data link 84, and before execution continues at check unit 78.

In check unit 78, a test is made of whether the last process signal variable in the list obtained via access sub-module 64 has been processed. If it has not, then execution returns to calculate sub-module 72 for exception update processing of the next process signal variable, otherwise execution is returned to the control sub-module 62 by the return unit 80.

Now returning to FIG. 2, after receiving the list of process signal variables determined by the exception update module 50 to be outside the limits of their predetermined update bands, their new process signal values and an indication of exception update detection, display executive sub-module 52 replaces the existing process signal values in the process signals values sub-module 55 with the new process signal values, and outputs each new process signal value to the CRT 40 via display update processor sub-module 56 and CRT driver sub-module 58.

Certain modifications and improvements will occur to those skilled in the art upon reading the foregoing. It should be understood that all such modifications and improvements have been deleted herein for the sake of conciseness and readability but are properly within the scope of the following claim.

We claim:

1. A system for constantly updating plant operator displays of dynamic plant data on a sequentially checked and selective basis comprising:
   multiplexing means for providing a predetermined series of different current operating plant variables and a signal indicating the end of the series of plant variables;
   data base means for constantly storing the different series of current operating plant variables generated by said multiplexing means;
   display means for displaying the dynamic plant data;
   exception control means, connected to said multiplexing means actuated by the signal indicating the end of the series to sequentially compare the presently displayed data on said display means with the just stored data in said data base means against a certain absolute value; and
   wherein said exception control means includes a control module connected to said display means for displaying only said just stored data that exceeds the certain absolute value of said exception control means until the last of the predetermined series of variables is compared for display update.

* * * * *